United States Patent [19]

Goto et al.

[11] Patent Number: 4,681,207

[45] **Date of Patent: * Jul. 21, 1987**

[54] ESCALATOR

[75] Inventors: Shigeru Goto, Ichinomiya; Masaru Asano, Kohnan; Matsuhiko Ishida, Inazawa; Shosaku Inoue, Misato, all of Japan

[73] Assignee: Mitsubishi Denki Kabushiki Kaisha, Tokyo, Japan

[ * ] Notice: The portion of the term of this patent subsequent to Dec. 10, 2002 has been disclaimed.

[21] Appl. No.: 724,662

[22] Filed: Apr. 18, 1985

[30] Foreign Application Priority Data

Apr. 19, 1984 [JP] Japan .................................. 59-78983

[51] Int. Cl.4 .................................................. B65G 9/12

[52] U.S. Cl. ...................................... 198/333; 198/321

[58] Field of Search ............... 198/333, 326, 321, 322, 198/324, 327, 330

[56] References Cited

U.S. PATENT DOCUMENTS

| | | | |
|---|---|---|---|
| 4,326,622 | 4/1982 | Ellzey | 198/333 X |
| 4,557,369 | 12/1985 | Ishida et al. | 198/333 |
| 4,569,433 | 2/1986 | Ishida et al. | 198/333 |

FOREIGN PATENT DOCUMENTS

| | | | |
|---|---|---|---|
| 2719394 | 11/1978 | Fed. Rep. of Germany | 198/333 |
| 3046203 | 7/1982 | Fed. Rep. of Germany . | |
| 1420418 | 11/1965 | France | 198/321 |
| 56-41555 | 9/1981 | Japan . | |
| 59-7685 | 1/1984 | Japan . | |

OTHER PUBLICATIONS

"Escalator Modification for the Handicapped", U.S. Department of Commerce, National Technical Information Service, Jul. 1980.

*Primary Examiner*—Joseph E. Valenza

*Attorney, Agent, or Firm*—Leydig, Voit & Mayer

[57] ABSTRACT

An escalator comprising four kinds of steps is disclosed. The first steps are ordinary steps, and the second step is disposed between the first steps and has a retractable support device for supporting a vertically movable step of the third step. The movable step supported by the support device lifts from the third step as the steps ascend to provide a deeper effective tread together with the tread of the second step. The fourth step includes a drop-down step which can be moved into a sloped position which also provides a space for safely accommodating a wheelchair or the like on the deep effective tread thus provided by the second, third, and fourth steps.

5 Claims, 19 Drawing Figures

ESCALATOR

BACKGROUND OF THE INVENTION

This invention relates to an escalator or a moving staircase, and more particularly to an escalator which can transport not only standing passengers, but also vehicles such as wheel chairs for physically handicapped persons.

Japanese Laid-Open Patent Application No. 56-41555 discloses an escalator which can transport a wheel chair or the like. In that invention, deep steps which can accommodate a wheel chair are disposed at intervals along a circulating path between pairs of conventional steps. However, it has the defects that since the radii of the circulating path of the steps for the wheel chair at the lower and upper turn-around portions thereof become large, the depth of the main frame of the moving escalator becomes large, limiting the places in which it can be installed.

SUMMARY OF THE INVENTION

Accordingly, it is a principal object of the present invention to provide an escalator which can eliminate the defects in the conventional escalators described above and which can transport a wheel chair or the like in addition to usual standing passengers.

It is a further object of the present invention to provide an escalator which can be installed wherever a usual escalator for standing passengers can be installed. With the above objects in view, an escalator of the present invention comprises a main frame disposed in a sloped position and defining therein a circulating loop path having a load bearing run including an upper and lower horizontal portion and an intermediate sloped portion, a return run, an upper turn-around portion, and a lower turn-around portion; a plurality of first steps having treads and serially disposed along the circulating loop path for circulating movement therealong the first steps move horizontally with their treads maintained horizontally when the first steps are in the upper and lower horizontal portions, and the first steps moving upwardly and downwardly along the sloped portion with their treads maintained horizontally when they are in the intermediate sloped portion; a second step disposed between the first steps for circulating movement together with the first steps and having forks mounted thereon, a forward and rearward moving mechanism for the forks, the forks normally being in a retracted position and capable of moving to a projecting position when the mechanism is actuated; the mechanism having an inputting means for moving the forks between the retracted and projecting positions; a third step disposed between the first and the second steps on the lower side of the second step for circulating together with the first and second steps and having mounted thereon a vertically movable step which normally is maintained in a lowered position by the forks in the retracted position; a first drive mechanism, disposed on the main frame at each of the lower and upper horizontal portion of the load-bearing run, the drive mechanism being normally in a retracted position and, when actuated, engageable with the inputting means when the second step is stopped at either horizontal portion of the load-bearing run to move the forks in the projecting position; a second drive mechanism disposed on the main frame at each of the lower and upper horizontal portions of said load-bearing run, said second drive mechanism being normally in a retracted position and being brought into engagement with the inputting means of a movement mechanism of the third step when the third step is stopped at either horizontal portion of said load-bearing run to actuate said movement mechanism to pull out an engaging rod from the engaging hole; a fourth step disposed between the first and the second steps on the upper side of the second step for circulating movement together with the first steps and having mounted thereon an inclinable portion a movable mechanism for the inclinable portion, the inclinable step normally being maintained horizontally and changeable to a sloped position when the movable mechanism is actuated; the movable mechanism of the fourth step including an inputting member normally maintained in a retracted position and capable of moving into a forward position when actuated; a forward drive mechanism mounted on the main frame at each of the lower and upper horizontal portions of the load-bearing run; a displacement mechanism for the forward drive mechanism, the forward drive mechanism being normally maintained in its retracted position and, when actuated, engageable with the movable mechanism of the fourth step when the fourth step is stopped at either horizontal portion of the load-bearing run for moving the inputting member of the movable mechanism of the fourth step forward; and an actuator rail mounted to the main frame along the load-bearing run, the actuator rail being engageable with the inputting member of the movable mechanism of the fourth step when the inputting member is in the forward position for displacing the inputting member of the fourth step in the sloped portion of the load-bearing run to incline the inclinable portion of the fourth step.

BRIEF DESCRIPTION OF THE DRAWINGS

The invention will become more readily apparent from the following detailed description of the preferred embodiment of the invention taken in conjunction with the accompanying drawings, in which.

DESCRIPTION OF THE PREFERRED EMBODIMENTS

Figure 1:
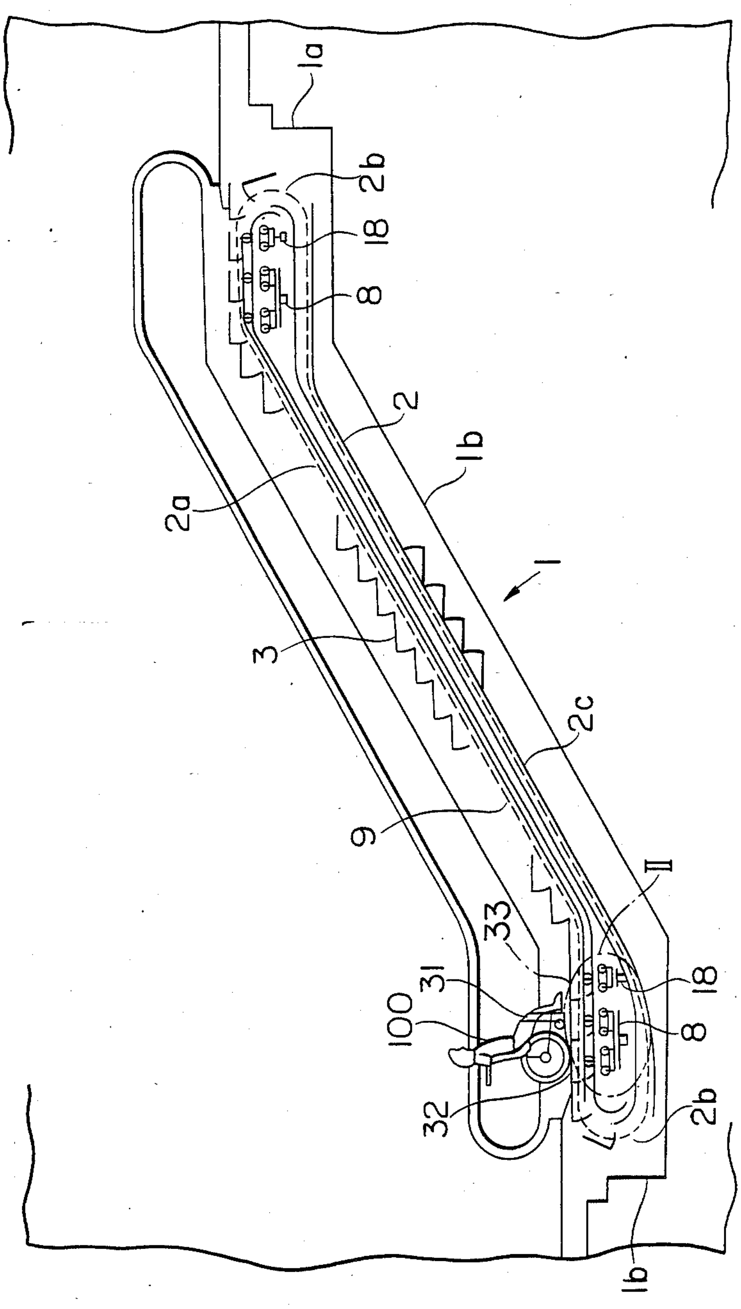
FIG. 1 is a schematic view of an escalator constructed in accordance with the present invention.

Reference will now be made to FIGS. 1 to 19 wherein an embodiment of the present invention is illustrated. In the drawings, in particular in FIG. 1, an escalator of the present invention comprises a main frame 1 having an upper end portion 1*a*, a lower end portion 1*b*, and an intermediate sloped portion 1*c* disposed in a sloped position. The main frame defines therein an endless circulating loop path 2 having a load-bearing run 2*a* including upper and lower horizontal portions and an intermediate sloped portion, upper and lower turn-around portions 2*b*, and a return run 2*c*. A number of conventional first steps 3 are arranged along the circulating path 2. Reference numeral 3*a* (FIG. 2) represents a shaft of the step 3, 3*b* represents front wheels rotatably provided at each end of the shaft 3*a*, and 3*c* represents rear wheels rotatably supported by the step 3 on each of its sides at remote portions from the shaft 3*a*. 31 indicates a number of specifically-constituted second steps disposed between a pair of the first steps, preferably at equal intervals along the circulating path 2, and constituted similarly to the first steps 3, i.e., each being provided with a shaft 31*a* at its front end portion, two front wheels 31*b* rotatably mounted on the shaft 31*a* at its ends, and two rear wheels 31*c* rotatably supported by the step 31 at each side remote from the shaft 31*a*.

Figure 4:
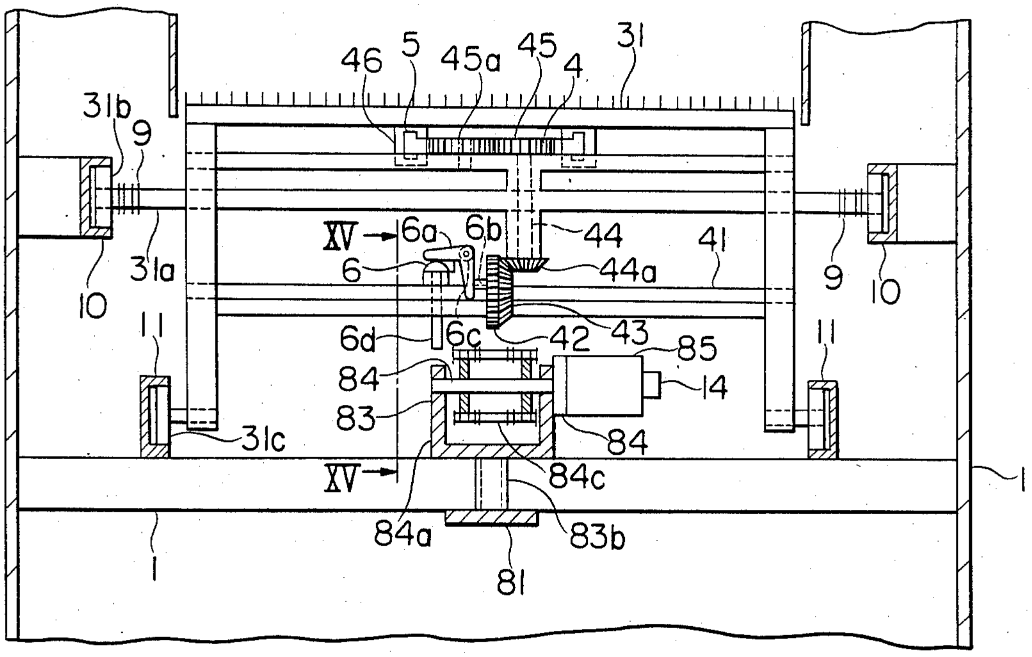
FIG. 4 is a cross sectional view taken along Line IV—IV of FIG. 2.
Figure 5:
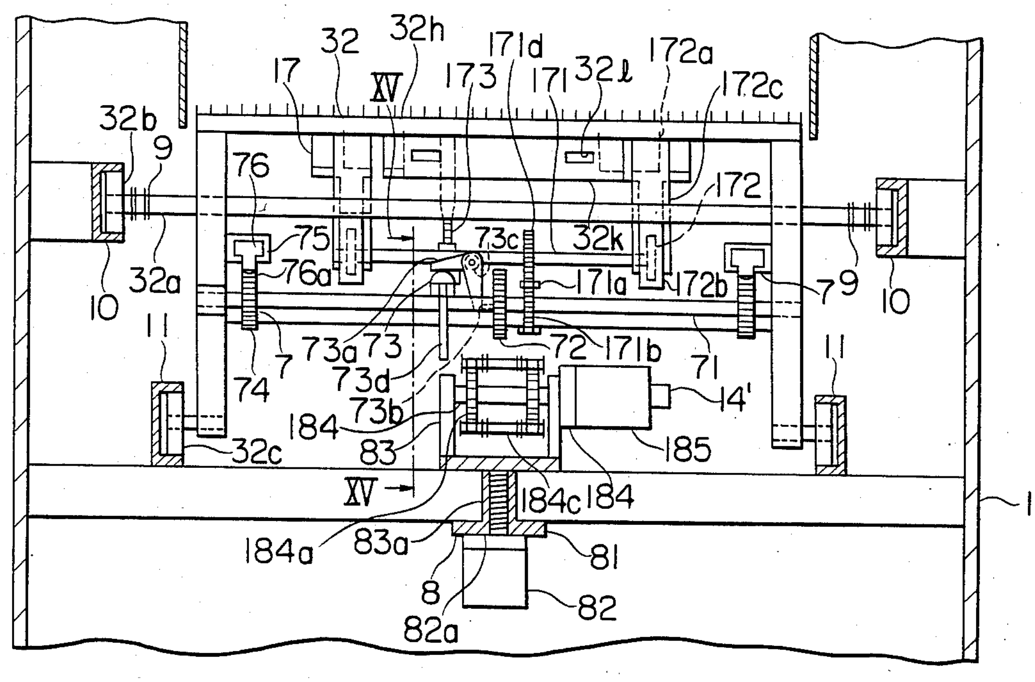
FIG. 5 is a cross sectional view taken along Line V—V of FIG. 2.

A forward and backward moving mechanism 4 for forks 5 is provided in the second step 31 within its lower space and comprises, as shown in FIGS. 4 and 5, a shaft 41 rotatably mounted on the second step 31 and having its lengthwise direction disposed transversely to the circulating direction of the second step 31, an input or driven member 42 fixedly secured to the shaft 41 and comprising a sprocket wheel 423, a number of holes 42*a* formed in the input member 42 equidistant from the axis of the shaft 41, a shaft 44 vertically rotatably mounted on the under surface of the second step 31, a bevel gear 44*a* fixedly secured to the shaft 44 at its lower end so as to be in mesh with a bevel gear 43 (FIG. 4), and a spur gear 45 fixedly secured to the upper end of the shaft 44.

Figure 3:
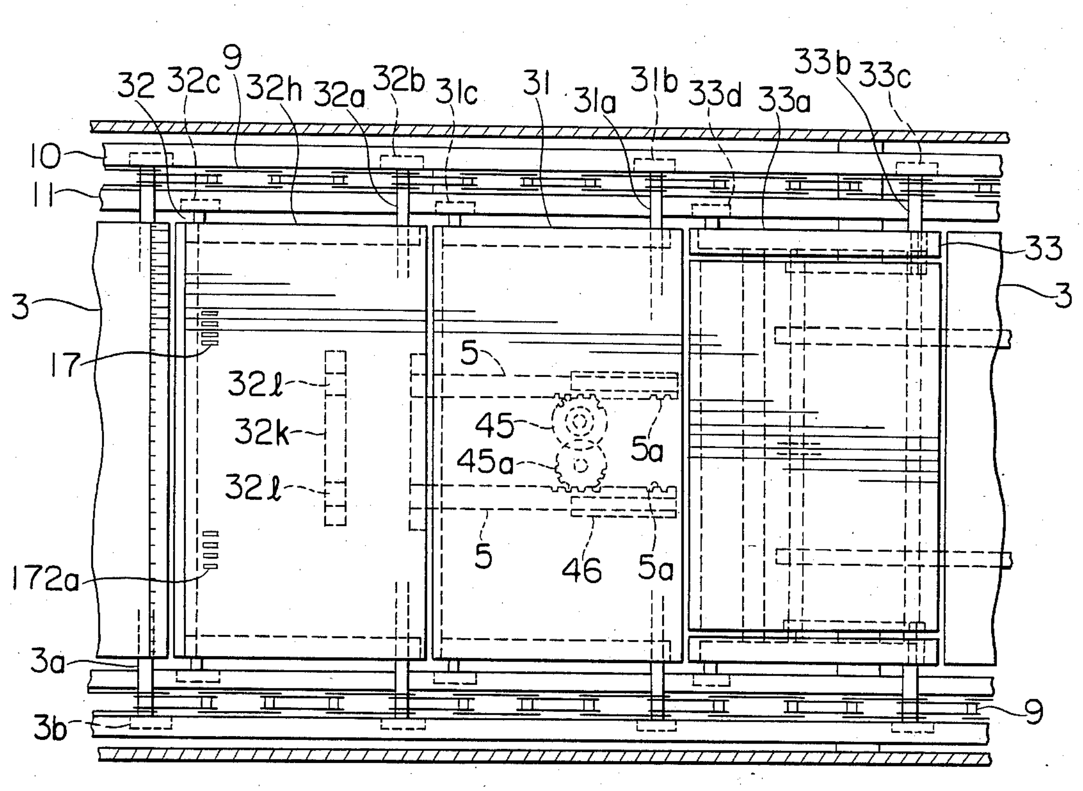
FIG. 3 is a plan view of the portion illustrated in FIG. 2.

In FIGS. 3 and 4, guide members 46 are fixedly secured to the lower surface of the second step 31 so as to be parallel to the direction of movement of the escalator. The guide members 46 each have generally a channel-shaped cross section with the flange which is disposed outwards being wider than the flange which is disposed inwards as shown in FIG. 4. Straight rod-like forks or bars 5 are linearly shiftably received within the space formed within the guide members 46 each having generally an L-shaped cross section so as to conform to the inner cross-sectional outline of the guide members 46. Each bar fork or 5 is formed with a rack 5*a*, which meshes with the spur gear 45 or 45*a*, on its side confronting the other fork or bar 5.

In FIG. 4, blocking mechanism 6 comprises an L-shaped lever 6*a* pivotally mounted at its vertex to the second step 31 by a pin 6*b*, a torsion spring 6*c*, and a rod 6*d*. The pin 6*b* is provided at the end of one of the arms of the lever 6*a* and faces the side surface of the input member 42 so as to correspond to any one of the pin holes 42*a*. The torsion spring 6*c* is mounted at the connecting portion at the vertex of the lever 6*a* to the second step 31 and urges the lever 6*a* so that the pin 6*b* fits into one of the pin holes 42*a*. The rod 6*d* is vertically and shiftably held by the second step 31 on its under surface and has its upper end abut against the lower surface of the other of the arms of the lever 6*a*.

Figure 2:
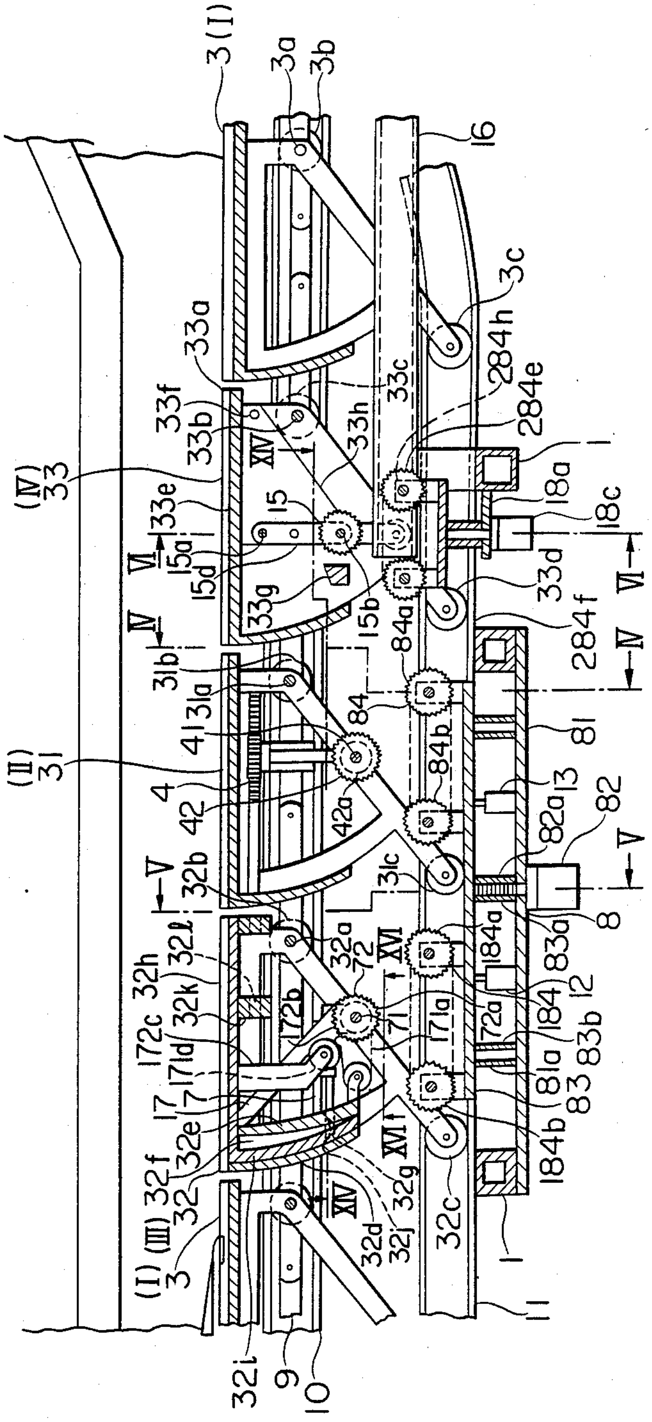
FIG. 2 is an enlarged vertical sectional view of the portion of FIG. 1 enclosed by the dash line II of FIG. 1.
Figure 14:
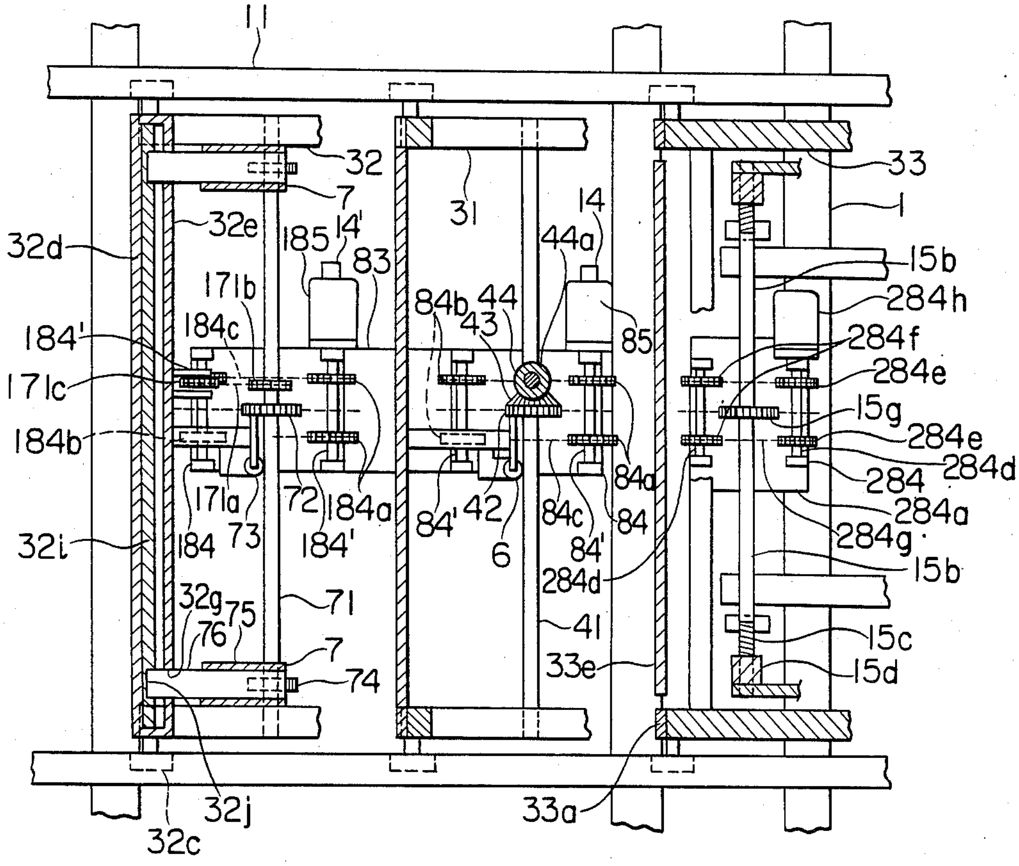
FIG. 14 is a cross-sectional view taken along Line XIV—XIV of FIG. 2.
Figure 15:
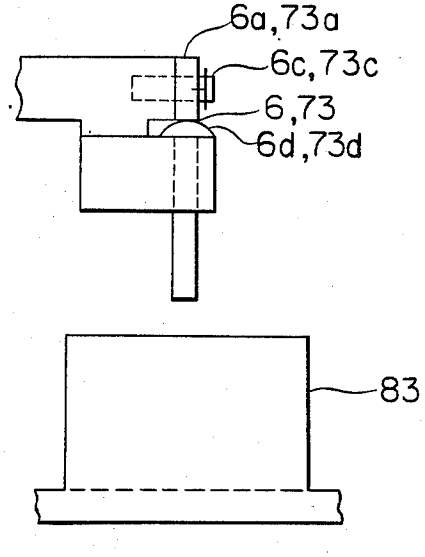
FIG. 15 is an enlarged cross-sectional view taken along Line XV—XV of FIGS. 4 and 5.

In FIGS. 1 to 3 and 5, reference numeral 32 is a third step adjoining the second step 31 at the lower side of the main frame 1, the third step 32 being provided in the circulating path 2 and being constituted similarly to the first step 3. It comprises a shaft 32*a* at its front end, front wheels 32*b* rotatably mounted to the ends of the shaft 32*a*, and rear wheels 32*c* rotatably mounted to the third step 32 at its sides remote from the shaft 32*a*. In FIG. 14, 32*d* is a riser of the third step 32, 32*e* is an upright wall arranged along the riser 32*d* and rigidly connected to the third step 32 at its under surface and spaced apart from the riser 32*d* with a gap 32*f* being left therebetween, 32*g* represents holes formed in the upright wall 32*e* near both ends. In FIG. 2, 32*h* is a movable footboard of the third step 32, and 32*i* is a riser of the movable footboard 32*h* suspended from the rear end thereof and adapted to be disposed within the gap 32*f*. The riser 32*i* also includes a curved surface conforming to the shape of the inner surface of the riser 32*d* so that there is no clearance between its outer surface and the inner side of the riser 32*d* throughout the upward movement of the movable footboard 32*h*.

Reference numeral 32*j* indicates engaging depressions formed in the riser 32*i* near each of its sides which correspond to the holes 32*g* formed in the upright wall 32*l*. 32*k* is an engaging member fixedly and transversely mounted on the under surface of the movable footboard 32*h* within a longitudinal separation left therebetween. The engaging member 32*k* is formed with engaging holes 32*l* which are added to engage the forward end portions of the forks 5 when the latter are actuated.

In FIG. 2, a lock mechanism 7 provided in the third step 32 comprises a shaft 71 arranged in parallel with the shaft 41 of the second step 31 and rotatably mounted to the third step 32 in a manner similar to the shaft 41 in the second step 31, an input member 72 fixedly secured to the shaft 71 at its mid-portion similar to the input member 42 on the shaft 41 and longitudinally aligned therewith, pin holes 72*a* formed in the wall of the input member 72 on a circle at regular angular intervals similar to the pin holes 42*a* of the input member 42, and a blocking mechanism 73 (FIG. 5) having a constitution similar to the blocking mechanism 6, comprising a lever 73*a*, a pin 73*b*, a torsion spring 73*c*, and a vertical rod 73*d*.

Reference numeral 74 indicates spur gears fixedly connected to the shaft 71 near each end, 75 indicates guide members fixedly secured to the third step 32 below it by any suitable means at intervals so as to be located above each of the respective spur gears 74, the guide members 75 each having generally a channel-shaped cross section and being provided with confronting flanges at the open end portion, the open end portion being disposed downwards and elongating horizontally in the longitudinal direction. 76 indicates engaging rods each having a cross section substantially corresponding to the space formed within the guide members 75 and shiftably received therein, each engaging rod 76 being arranged so as to pass through the hole 32*g* formed in the upright wall 32*e* and adapted to engage the engaging depression 32*j* formed in the riser 32*i* of the moving footboard 32*h*. Each engaging rod 76 is provided so as to be in mesh with the spur gear 74.

Figure 17:
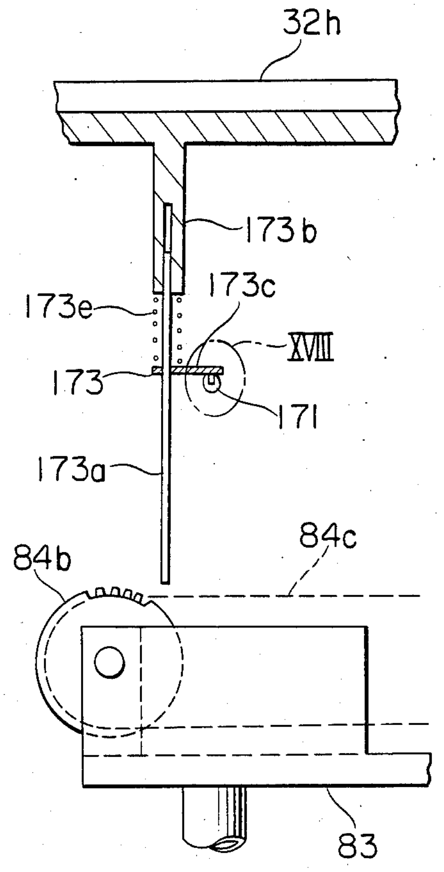
FIG. 17 is an enlarged cross sectional view taken along Line XVII—XVII of FIG. 16.
Figure 18:
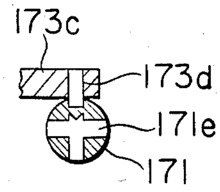
FIG. 18 is an enlarged cross-sectional view taken along Line XVIII—XVIII of FIG. 17.
Figure 19:
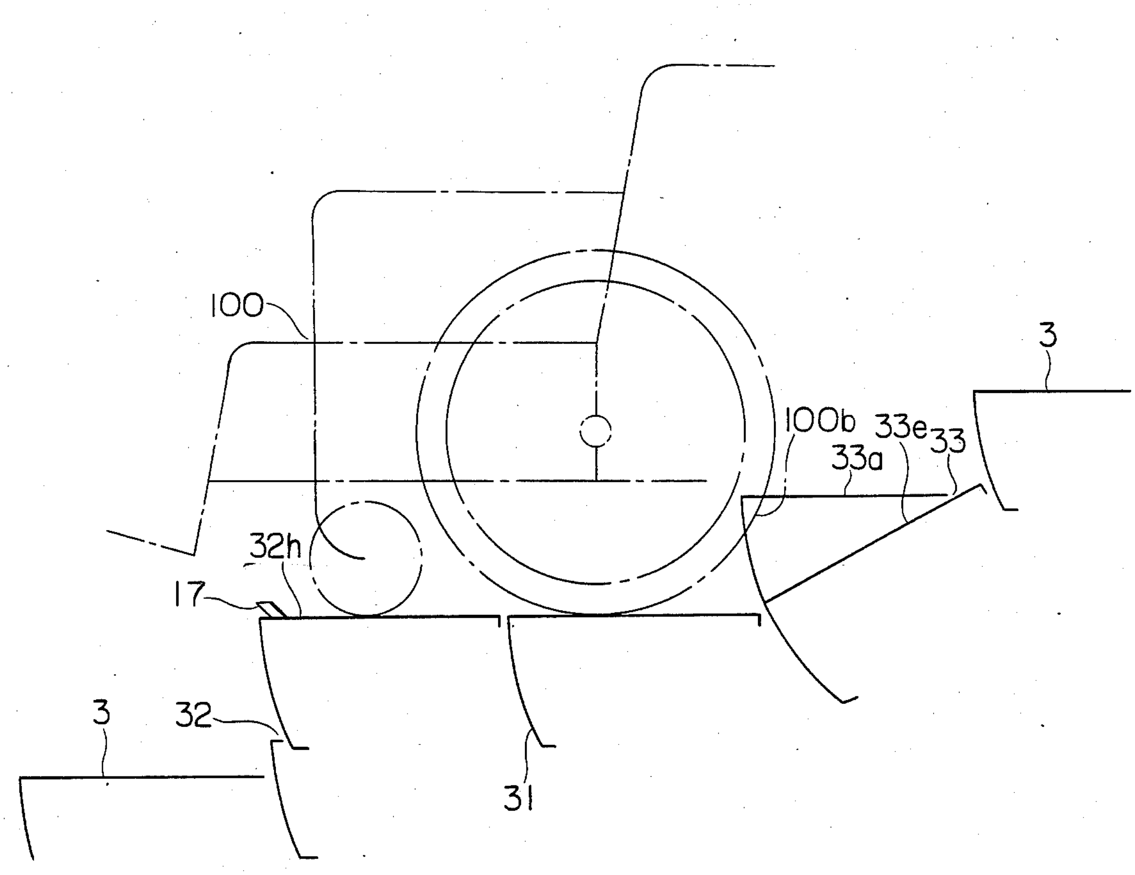
FIG. 19 is a schematic side view similar to FIG. 11 but illustrating the state in which the wheel chair is being conveyed downwards.

In FIG. 2, a wheel stop means 17 is provided, and comprises a shaft 171 rotatably supported by the movable footboard 32*h* to extend in the widthwise direction of the third step 32, an endless roller chain 171*a* wound around a sprocket wheel 171*b* fixed on the shaft 71 of the lock mechanism 7 and a sprocket wheel 171*c* rotatably mounted on the third step 32, a sprocket wheel 171*d* secured on the shaft 171 of the wheel stop means 17 to mesh with the roller chain 171*a*, a gear 172 (FIG. 5) securely mounted on the opposite ends of the shaft 171, wheel stop members 172*a* extending obliquely, the lower end of which is positioned close to the shaft 171 and the upper end of which is positioned close to the lower end of the main frame 1 of the movable footboard 32*h*, and has formed thereon a rack 172*b* which meshes with the gear 172. The wheel stop members 172*a* are slidably supported by a guide member 172*c* mounted on the movable footboard 32*h* and the upper end is capable of slidably engaging the hole formed in the movable footboard 32*h*. The wheel stop members 172*a* are usually held in their retracted positions. In FIGS. 5, 17, and 18 in particular, a lock mechanism 173 for the wheel stop means 17 is provided. The lock mechanism 173 comprises an actuator rod 173*a* vertically movably supported by a support portion 173*b* disposed on the movable footboard 32*h* with its lower end facing the uppermost edge of a movable frame 83 of a drive mechanism 8, an arm 173*c* secured at one end to the actuator rod 173*a* to protrude therefrom to be positioned above the shaft 171, a pin 173*d* projecting downward from the projecting end of the arm 173*c* to face a cross-shaped hole 171*e* formed in the shaft 171, and a compression spring 173*e* engaged by the actuator rod 173*a* and disposed between the support portion 173*b* and the arm 173*c* for downwardly biasing the arm 173*c*.

In FIG. 2, the drive mechanism 8 is used to automatically operate the forward and backward moving mechanism 4, the lock mechanism 7, and the wheel stop means 17 which are self-contained devices of the second and the third steps 31 and 32 when a person on a wheelchair 100 is to be conveyed by the escalator. Each drive mechanism 8 comprises a frame 81, a pair of protruding vertical guide rods 81*a* symmetrically mounted on the frame 81 with respect to the longitudinal midpoint, an electric motor 82 for up and down movement which is fixedly secured to the frame 81 on its under surface at its longitudinal midpoint and provided with a threaded output shaft 82*a*, a movable frame 83 arranged in parallel with the frame 81, a cylindrical engaging member 83*a* fixedly secured to the lower surface of the movable frame 83 at its longitudinal midpoint and having a female thread which engages the male thread of the output shaft 82*a*, and a pair of cylindrical bushings 83*b* which loosely receive the guide rods 81*a* of the frame 81. 84 is a first drive mechanism rotatably mounted in the longitudinal direction of the main frame 1 so as to be transverse thereto. 84*a* indicates sprocket wheels fastened to the first drive mechanism 84 spaced apart from each other and symmetric with regards to the sprocket wheel 423 of the second step 31. 84*b* indicates sprocket wheels which are rotatably supported by the movable frame 83 through a shaft 84' secured thereto at the end of the movable frame 83 opposite the first drive mechanism 84 and which are aligned with the sprocket wheels 84*a*. 84*c*, as best shown in FIGS. 4, 7, 8, and 9, is an endless drive belt comprising three-row roller chains with the outer rows being reeved on the sprockt wheels 84*a* and 84*b*, and the central row being adapted to engage the sprocket wheel 423 of the second step 31.

In FIG. 4, an electric motor 85 for the first drive mechanism 84 is mounted on the movable frame 83 for driving the shaft 84'.

From FIG. 14 it is seen that the drive mechanism 8 also comprises second drive mechanism 184 which is positioned in correspondence with the input member 72 of the third step 32 and constructed similarly to the first drive mechanism 84, and comprises a shaft 184' mounted on the movable frame 83 to extend in the widthwise direction of the main frame 1, a sprocket wheel 184*a* secured on the shaft 184', a sprocket wheel 184*b* rotatably mounted on the movable frame 83 in opposing relationship with the sprocket wheel 184*a*, an endless drive belt 184*c* comprised of a three-row roller chain wound about the sprocket wheels 184*a* and 184*b*, with the central roller chain corresponding to the input member 72, and an electric motor 185 for the second drive mechanism 184 mounted on the movable frame 83 for driving the shaft 184'.

As shown in FIG. 2, step chains 9 are arranged in the main frame 1 along the circulating loop path 2 so as to be engaged by the shafts 3*a*, 31*a*, 32*a*, and 33*b* of the steps 3, 31, 32, and 33 of the first, second, third, and fourth kinds, respectively. 10 indicates rails for front wheels secured to the main frame 1 along the circulating loop path 2 so as to guide the front wheels 3*b*, 31*b*, 32*b*, and 33*c* of the steps 3, 31, 32 and 33 of the first, second, third, and fourth kinds, respectively. 11 indicates rails for rear wheels secured to the main frame 1 along the circulating loop path 2 so as to guide the rear wheels 3*c*, 31*c*, 32*c*, and 33*d* of the steps 3, 31, 32, and 33 of the first, second, third, and fourth kinds, respectively. 12 is a switch mounted on the frame 81 which acts as a first detector to detect the completion of the descent of the movable frame 83, and 13 is a switch mounted on the frame 81 which acts as a second detector to detect the completion of the lifting of the movable frame 83. The switch 13 also detects the ascending of the forward driving mechanism 284 which will be described later. In FIG. 4, 14 is an integrating switch mounted on the shaft of the electric motor 85. The integrating switch 14 acts as a third detector responsive to the rotation of the shaft which detects the amount of projection or withdrawal of the forks 5. The switch 14 also acts as a start and stop switch for the electric motor 284*h* which will be described later. In FIG. 4, 14' is an integrating switch mounted on the shaft of the electric motor 185 and acts as a fourth detector for detecting the amount of movement of the engaging rod 75 in response to the rotation of the electric motor 185.

Figure 6:
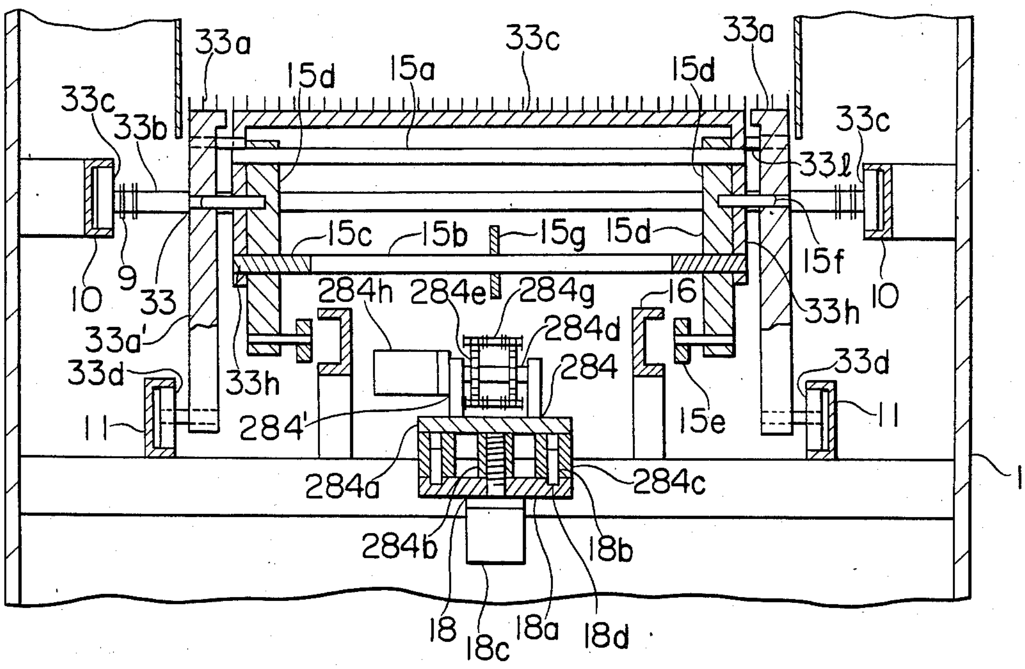
FIG. 6 is a cross sectional view taken along Line VI—VI of FIG. 2.
Figure 16:
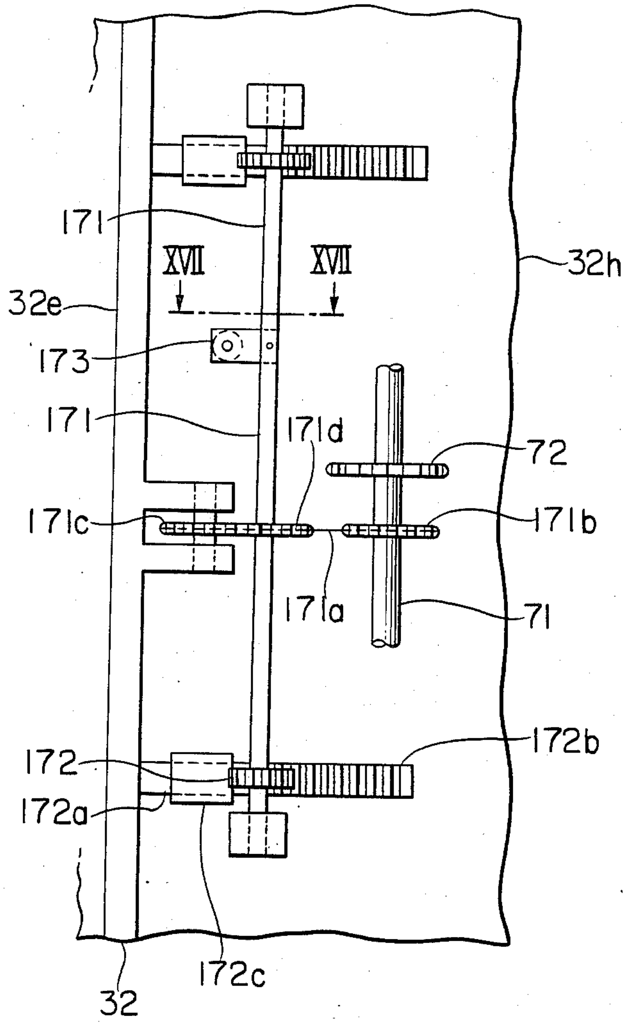
FIG. 16 is a cross-sectional view taken along Line XVI—XVI of FIG. 2.

In FIG. 2, numeral 33 represents a fourth step disposed adjacent to the second step 31, numeral 33*a* represents fixed steps forming the top surface of both widthwise end portions of the fourth step 33, numeral 33*b* represents a shaft of the fourth step 33, numeral 33*c* represents front wheels which are rotatably supported by both ends of the shaft 33*b*, numeral 33*d* represents rear wheels rotatably mounted on the fourth step 33 at the end opposite from the shaft 33*b*, numeral 33*e* represents a tiltable or dropdown step disposed between the fixed steps 33*a* with the width of the movable step 33*e* being wider than that of a wheelchair 100, and with the edge thereof which is close to the upper end portion 1*a* of the main frame 1 being pivotably attached to the fourth step 33 by a pin 33*f*. Numeral 33*g* represents a connecting member provided at the end of the fourth step 33 nearest the lower end portion 1*b* of the main frame 1 which connects both sides of the body of the fourth step 4 with each other. In FIGS. 2 and 6, numeral 15 represents a movable mechanism installed on the lower side of the tiltable step 33*e*, numeral 15*a* represents a guide rod of the movable mechanims 15 both ends of which are fixed to brackets 33*h* hangingly secured to both lateral sides of the tiltable step 33*e*, numeral 15*b* represents an operating shaft which is disposed in parallel with and displaced from the under side of the guide rod 15*a*, both ends of which are rotatably supported by the brackets 33*h*. In both ends of the operating shaft 15*b* are secured screws 15*c* which face one another. Numeral 15*d* represents input members of the movable mechanism 15, the upper ends of which are rotatably mounted on the guide rod 15*a*. The input member 15*d* are disposed close to both sides brackets 33*h*, and the middle parts thereof are secured to the screws 15*c* of the shaft 15*b* and hang downwards. The lower end portions thereof are rotatably supported by rollers 15*e*. Numeral 15*f* represents maintaining members projecting from the input member 15*d* which pass through the brackets 33*h* with clearance and fit into holes in a frame 33*a*' of the fixed step 33*a*, and numeral 15*g* represents a sprocket wheel secured to the operating shaft 15*b*. In FIGS. 2 and 6, 16 designates operating rails disposed on the main frame 1 to extend along the load-bearing run 2*a* in correspondence to the rollers 15*e* of the input member 15*d*.

In FIG. 6, numeral 18 represents a displacement mechanism secured to the main frame 1 at the ends of the load-bearing run 2*a*. The displacement mechanism 18 has a structure and function similar to that of the drive mechanism 8 and automatically operates the movable mechanism 15 of the fourth step 33 when the wheelchair 100 is to be transported. Numeral 18*a* denotes arms projecting from the main frame 1, numeral 18*b* denotes guide rods extending from the arms 18*a*, and 18*c* denotes a vertically moving motor having screws 18*d* which serve as output shafts.

The displacement mechanism 18 comprises a forward drive mechanim 284, which comprises a frame 284*a*, an engaging member 284*b* secured on the bottom face of the frame 284*a* and having formed thereon a female screw corresponding to the screw 18*d*, a cylindrical guide member 284*c* secured on the bottom surface of the frame 284*a* and can loosely receive the guide rod 18*b*, a third drive means 284' which corresponds to the sprocket wheel 15*g* of the fourth step 33, a shaft 284*d* mounted on the end portion of the forward drive mechanism 284 with its axis extending in the direction of width of the main frame 1, a sprocket wheel 284*e* secured on the shaft 284*d*, a sprocket wheel 284*f* (FIG. 14) rotatably mounted on the end of the shaft 284*d* opposite to the sprocket wheel 284*e* of the forward drive mechanism 284, a drive belt 284*g* composed of endless three-row roller chains wound around the sprocket wheels 284*e* and 284*f* with its central chain corresponding to the sprocket wheel 15*g* of the movable mechanism 15, and an electric motor 284*h* of the third drive mechanism 284' mounted on the frame 284*a* for driving the shaft 284*d*.

With the arrangement described above, the escalator of the present invention is usually in the position shown in FIG. 2, in which the forks 5 are in the retracted position, the movable frame 83 of the drive mechanism 8 is held in its retracted position, the movable footboard 32*h* is held by the third step 32 by the engaging rod 76 and the hole 32*g*, and the operations of the forward and backward moving mechanism 4 and the locking mechanism 7 are prevented by the engagements of the pins 6*b* and 73*b* of the blocking mechanisms 6 and 73 with the pin holes 42*a* and 72*a* of the input members 42 and 72, respectively. Further, the wheel stop members 172*a* are retracted in the tread surface of the movable footboard 32*h*, and since the movable frame 83 is retracted, the pin 173*d* engages either one of the cross-shaped holes 171*e* in the shaft 171 to actuate the lock mechanism 173 to prevent the operation of the wheel stop means 17 as illustrated in FIG. 18. Also, in the usual position of the escalator, the forwared drive mechanism 284 is held in its retracted position as shown in FIG. 2, the input member 15*d* of the movable mechanism 15 is maintained in its retracted position in which the input member 15*d* is brought into contact with the brackets 33*h* of the tiltable step 33*e* as shown in FIG. 6, and the roller 15*e* disengages from the operating rail 16 and the maintaining member 15*f* engages a bracket 33*a*' of the fixed step 33*a*, thereby maintaining the tiltable step 33*e* in its horizontal position.

The steps of the first to fourth kinds 3, 31, 32, and 33 of the escalator are driven along the circulating loop path by the unillustrated drive mechanism mounted on the main frame 1 through the step chains 9. During this movement, the front wheel 3*b*, 31*b*, 32*b*, and 33*c* are guided by the front wheel rail 10 and the rear wheels 3*c*, 31*c*, 32*c*, and 33*d* are guided by the rear wheel rail 11, and none of the first to fourth steps 3, 31*c*, 32*c*, and 33*d* engages with the drive mechanism 8 and the displacement mechanism 18. Thus, in the usual operations, these steps behave as ordinary escalator steps suitable for conveying ordinary passengers without a wheelchair.

Figure 7:
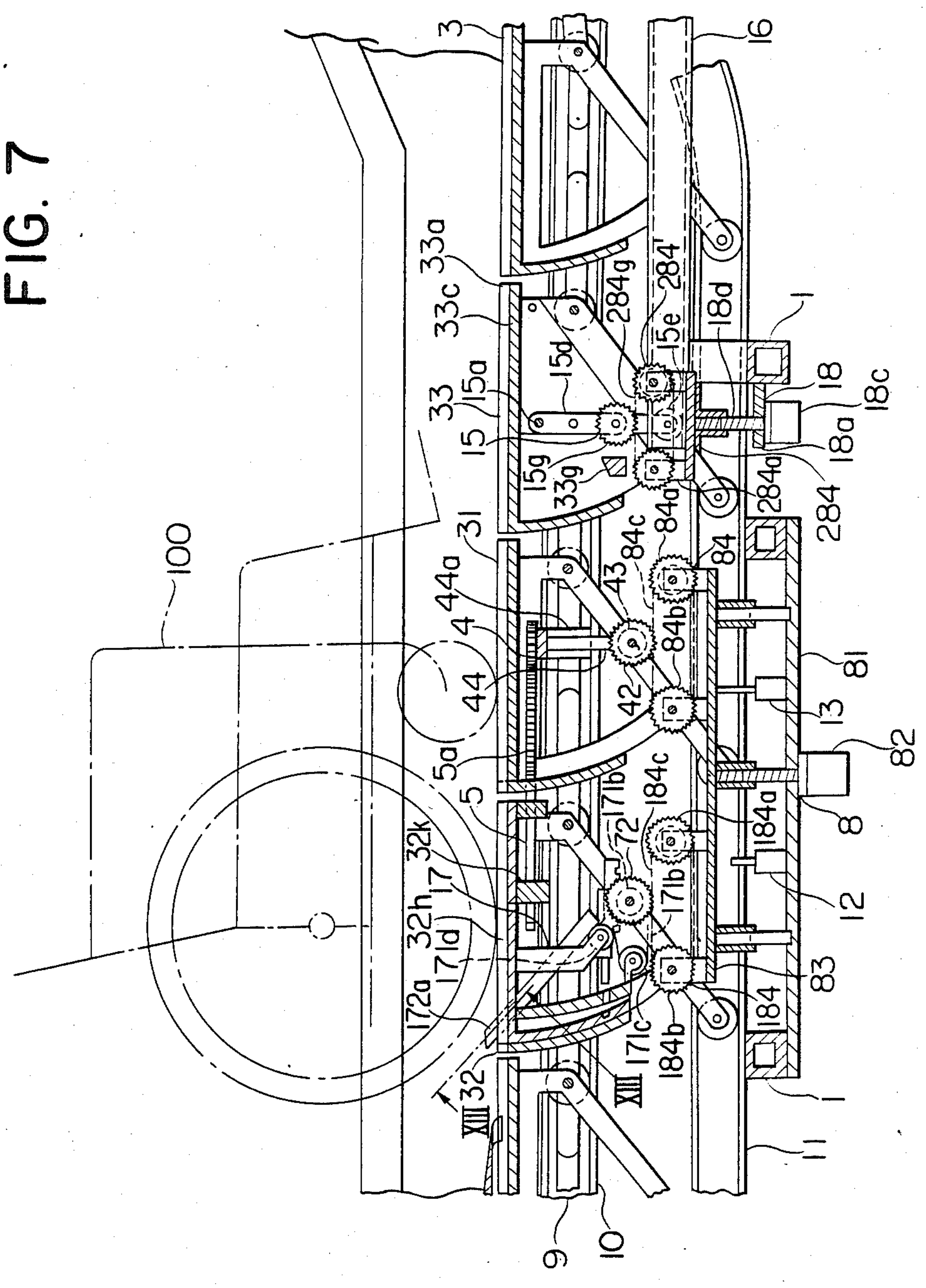
FIG. 7 is side view illustrating the position in which a wheel chair is placed on the escalator when the drive mechanism and the displacement mechanism are operated.
Figure 8:
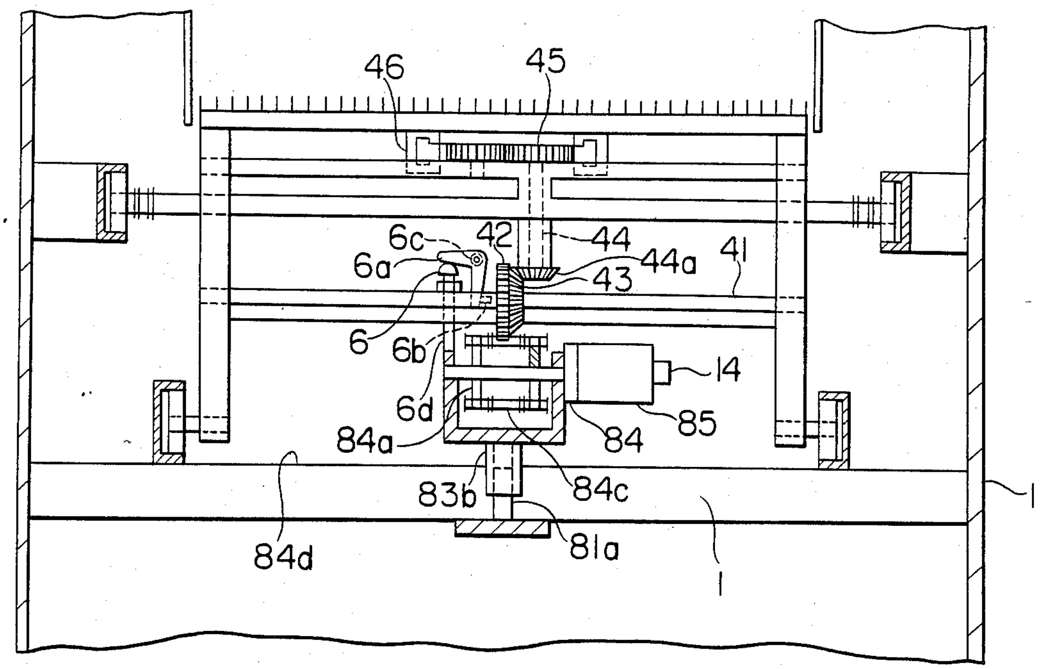
FIG. 8 is a cross-sectional view similar to FIG. 4 but showing the situation of FIG. 7.
Figure 9:
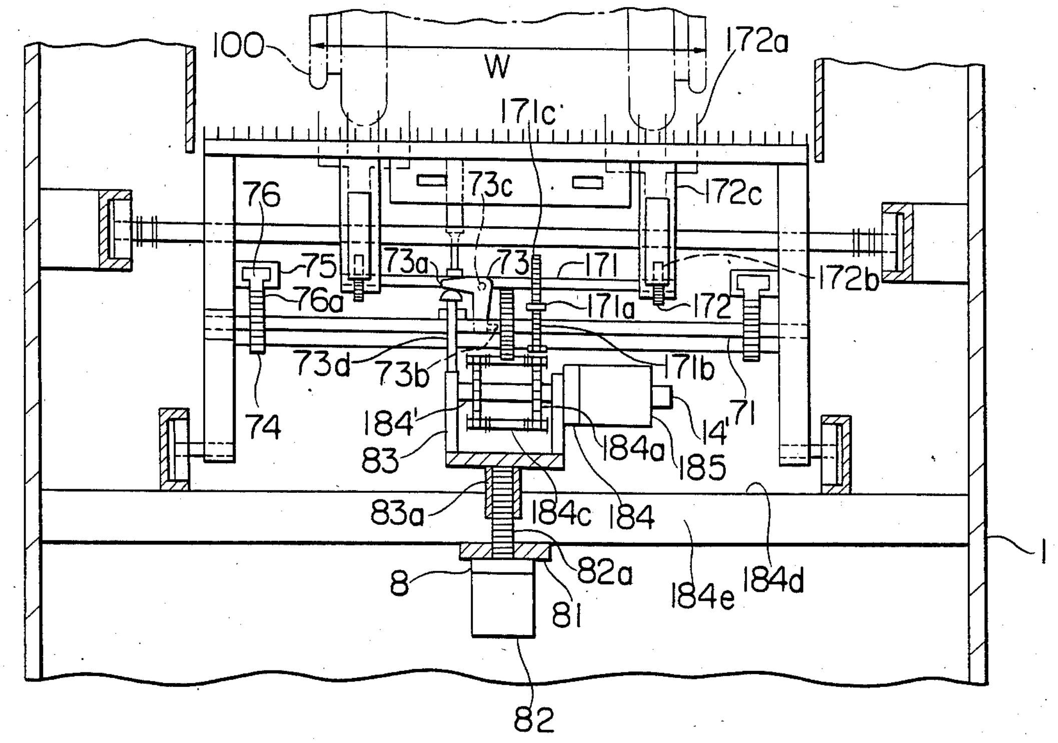
FIG. 9 is a cross-sectional view similar to FIG. 5 also showing the situation of FIG. 7.
Figure 13:
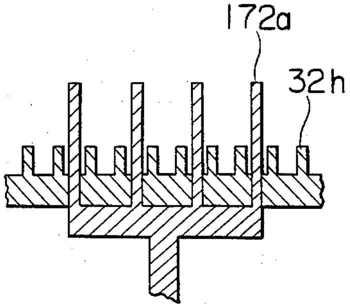
FIG. 13 is a cross-sectional view taken along Line XIII—XIII of FIG. 7.

When it is desired to convey a wheelchair passenger upward during the movement of the escalator under the conditions described above, the second to fourth steps 31, 32, and 33 are to be stopped at the lower end portion of the circulating loop path as shown in FIG. 2. Then after the wheel chair 100 has been moved onto the third step 32 as shown in FIG. 7, the electric motor 82 is energized to rotate the output shaft 82*a* which is engaged with the engagement member 83*a* to raise the movable frame 83 under the guidance of the guide rods 81*a* and the cylindrical bushings 83*b* to the position illustrated in FIG. 7. When the movable frame 83 moves by a predetermined distance, the second detector 13 actuates to deenergize the electric motor 82 and the electric motor 82 is stopped by the brake. In this position, the drive belt 84*c* engages the input member 42 and the drive belt 184*c* engages the input member 72. Also, since the rods 6*d* and 73*d* are pushed up when the movable frame 83 rises, the L-shaped 6*a* is rotated to disengage the pins 6*b* and 73*b* from the pin holes 42*a* and 72*a* of the input member 42 and 72. Then, the electric motor 85 shown in FIG. 14 is energized to drive the drive belt 84*c* through the sprocket wheels 84*a* and 84*b* to rotate the input member 42. Since the bevel gears 43 and 44*a*, the spur gears 45 and 45*a*, and the rack 5*a* are engaged, the forks 5 protrude as shown in FIG. 7 until the third detector 14 is actuated to stop the electric motor 85 and the forks 5 have completely been engaged with the engagement member 32*k* of the third step 32, thereby to provide a tread for the wheel chair 100. On the other hand, the actuator rod 173*a* is pushed up by the raised movable frame 83 and the pin 173*d* disengages from the cross-shaped hole 171*e* to release the locking action of the lock mechanism 173. Also, the electric motor 185 shown in FIG. 14 is energized to drive the drive belt 184*c* through the sprocket wheels 184*a* and 184*b*. This causes the actuation of the roller chain 171*a* and the sprocket wheel 171*d* to rotate the shaft 171 of the wheel stop means 17 through the rotation of the input member 72 to raise the guide members 172*c* through the gear 172 and the rack 172*b* to protrude above the tread surface of the movable footboard 32*h* as shown in FIGS. 7, 9 and 13. In synchronization with the operation of the wheel stop means 17, the engage rod 76 is pulled out from the hole 32*g* and the engaging depression 32*j* through the spur gear 74 and a rack 76*a* by the rotation of the input member 72 shown in FIG. 5, whereby the engagement between the riser 32*i* and the upright wall 32*e* is released as shown in FIG. 7, upon which the fourth detector 14' is actuated to deenergize and stop the electric motor 185.

Further, the electric motor 18*c* of the displacement mechanism 18 shown in FIG. 7 also is energized when the electric motor 82 is energized to rotate the output shaft 18*d* to raise the forward drive mechanism 284 as shown in FIG. 7 causing the drive belt 284*g* to engage the input member 15*d* of the movable mechanism 15, and the vertically moving motor 18*c* is deenergized to be stopped when the motor 82 is stopped.

Figure 10:
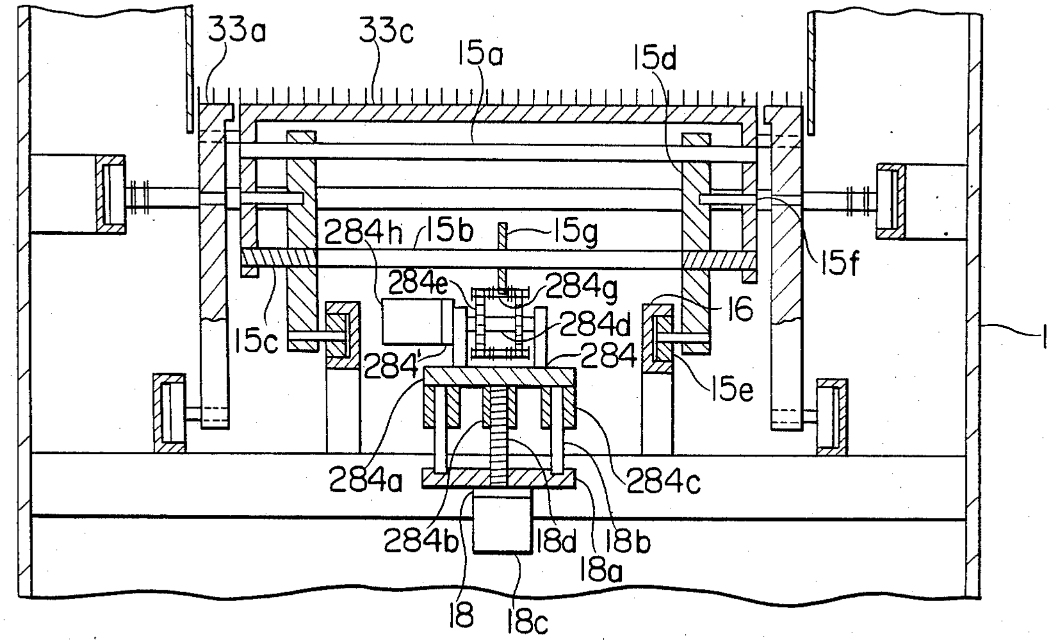
FIG. 10 is a cross sectional view similar to FIG. 6 showing the situation of FIG. 7.

Then, the electric motor 284*h* of the third drive means 284' shown in FIG. 10 is energized to rotate the operating shaft 15*b* through the drive belt 284*g* to move the input member 15*d* forward by the screw 15*c* to bring the roller 15*e* into the position of engagement with the operating rail 16 as shown in FIG. 10, whereupon the electric motor 284*h* is stopped by the third detector 14. Thereafter, when the electric motors 82 and 18*c* are reversely rotated to move the movable frame 83 and the forward drive mechanism 284 downward and the first detector 12 is pressed, the electric motors 82 and 18*c* are deenergized, whereby the movable frame 83 and forward drive mechanism 284 are returned and stopped at the home position. Also, the downward movement of the movable frame 83 causes the blocking mechanisms 6 and 73 to return to the positions in which they are effective to prevent the free movement of the forward and backward moving mechanism 4 and the lock mechanism 7. The lock mechanism 173 is also brought into an effective position in which the wheel stop means 17 is fixed.

Figure 11:
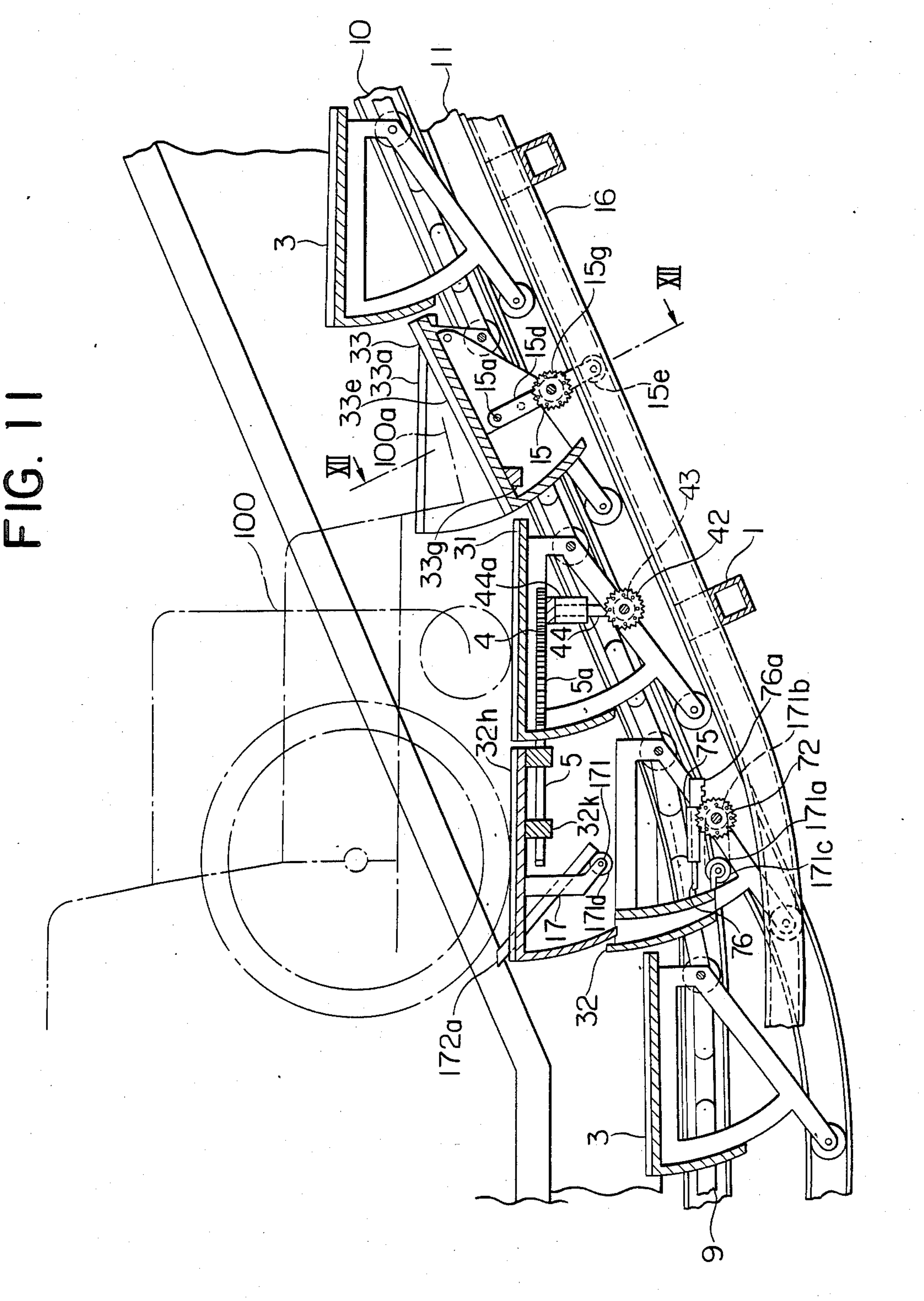
FIG. 11 is a side view illustrating the ascent of various steps shown in FIG. 7.
Figure 12:
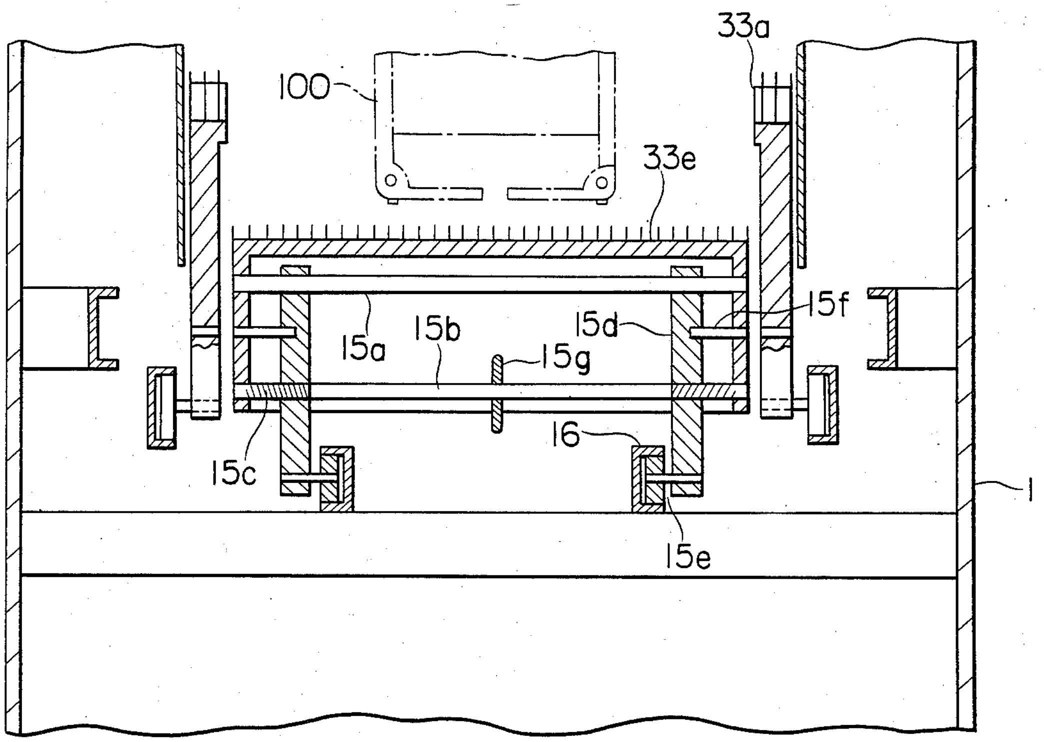
FIG. 12 is a cross-sectional view taken along Line XII—XII of FIG. 11.

When the steps of the escalator, i.e., the first to fourth steps 3, 31, 32, and 33 are driven along the circulating loop path 2, as the second step 31 and the third step 32 are moved along the curved transition portion of the escalator, the movable footboard 32*h* supported by the protruded forks 5 moves upward together with the second step 31 as shown in FIG. 11. Thus, a relatively wide horizontal flat area for receiving the wheelchair 100 is provided.

Also, since the rollers 15*e* of the fourth step 33 are in engagement with and guided by the operating rail 16, the drop-down step 33*e* is pivoted counterclockwise in FIG. 11 about the pin 33*f* as the fourth step 33 is moved into the transition portion 1*c* toward the intermediate sloped portion off the circulation loop path 2. Thus, the wheelchair 100 and its occupant can be safely accommodated in a relatively wide area on the steps without the fourth step 33 interfering with the occupant's feet.

As these steps 31, 32, and 33 pass through the upper transition portion into the upper horizontal portion, the drop-down step 33*e* pivots in a clockwise direction as viewed in FIG. 11 about the pin 33*f* to return to its horizontal position, and the movable footboard 32*h* descends to its lower position in which it is retracted into the third step 32. When the second and the third steps 31 and 32 come to a position above the drive mechanism 8, and the fourth step 33 comes to a position above the displacement mechanism 18, i.e., when the input member 42, the input member 72, and the input member 15*d* are positioned directly above the drive belts 84*c*, 184*c* and 284g, respectively, the escalator is stopped. When the escalator has come to a complete halt, the drive mechanism 8 and the displacement mechanism 18 of the upper end portion of the escalator are operated to pull out the forks 5 from the third step 32 and retract the guide member 172*e* within the third step 32. That is, as was done with respect to the lower horizontal portion of the escalator, the electric motors 82 and 18*c* are energized to raise the movable frame 83 and the forward drive mechanism 284 and release the blocking mechanisms 6 and 73 and the lock mechanism 173, and to bring the drive belts 84*c*, 184*c* and 284*g* into engagement with the respective input members 42, 72, and 15*d*. The electric motors 85, 185, and 284*h* are then driven in the direction opposite to that at the lower horizontal portion of the escalator to retract the guide member 172*c* and the forks 5 into the respective steps. Then, the input member 15*d* is retracted, the engaging rod 76 is inserted into the engagement hole 32*j*, the roller 15*e* is disengaged from the operating rail 16, and the maintaining member 15*f* is brought into engagement with the bracket 33*a*' of the fixed step 33*a* to prevent free pivotal movement of the drop-down step 33*e*. Then, the wheel chair 100 is moved onto the floor of the building from the steps of the escalator.

Next, the electric motors 82 and 18*c* are driven in the reverse direction to lower the movable frame 83 and the forward drive mechanism 284. At the same time, the blocking mechanisms 6 and 73 and the lock mechanism 173 are actuated to prevent the movement of the lock mechanism 7, the wheel stop means 17, and the forward and backward moving mechanism 4, whereby the second, third, and fourth steps 31, 32, and 33 return to function as ordinary steps similar to the first step 3. The movable frame 83 and the forward drive mechanism 284 continue to move downward until they return to their original positions where the electric motors 82 and 18*c* stop. Thereafter, the escalator can be operated in the same manner as an ordinary escalator with no special steps.

When it is desired to convey a passenger on a wheelchair downward, the second, third, and fourth steps 31, 32, and 33, respectively, are stopped directly above the displacement mechanism 18 of the drive mechanism 8. Then, the passenger on the wheelchair 100 is moved on the second and the third steps 31 and 32 and the movable frame 83 and the forward drive mechanism 284 are operated to engage the second, third, and fourth steps. Then the escalator can be driven to downwardly convey the passenger on the wheelchair 100 until they come to the position where the second to fourth steps 31, 32, and 33 are directly above the displacement mechanism 18 of the drive mechanism 8 in the lower horizontal section of the circulating loop path 2. In this position, the escalator is stopped and the movable frame 83 and the forward drive mechanism 284 are operated and the second, third, and fourth steps are disengaged from each other. The passenger can now be moved from the escalator to the lower floor, and the escalator can operate in a manner similar to an ordinary escalator. In this case also, since the wheelchair 100 is conveyed by the escalator with a edge of the drop-down step 33*e* lowered, the wheel 100*b* of the wheelchair 100 does not interfere with the fourth step 33, whereby the passenger on the wheelchair 100 can be conveyed safely in a sufficient space.

While the present invention has been described in connection with a particular preferred embodiment thereof, it is to be understood that many modifications and changes can be made. For example, while only one set of second, third and fourth steps is installed in the escalator in the above embodiment, two or more set of variable steps may be utilized. Also, the wheel stop means 17 may be omitted from the escalator. In this case, the wheelchair 100 must be prevented from moving on the escalator by any other suitable stop means such as brake on the wheelchair.

As has been described, according to the present invention, a set of special steps of a second, third, and fourth kind 31, 32, and 33 that are similar to ordinary escalator steps but can be used to form, in cooperation, a deeper step for accommodating thereon a wheelchair or the like are provided. The second and third steps 31 and 32 together provide a deep flat tread surface and the fourth step 33 provides a space for accommodating the front or rear part of the wheelchair. The escalator may be provided with wheel stop means 17 which prevent the wheelchair from dropping off the tread of the steps. Therefore, the escalator of the present invention provides a safe, sufficiently deep step for safely accommodating thereon a wheelchair without increasing the overall dimensions of the escalator, enabling the escalator to be installed in any space where an ordinary escalator can be installed. Also the operation of the mechanism for modifying the set of special steps for conveying a wheel-chair is simple and can be quickly operated.

What is claimed is:

1. An escalator comprising:

a main frame disposed in a sloped position and defining therein a circulating loop path having a load-bearing run including an upper and lower horizontal portion and an intermediate sloped portion, a return run, an upper turn-around portion, and a lower turn-around portion;

a plurality of first steps having treads and serially disposed along said circulating loop path for circulating movement therealong, said first steps moving horizontally with said treads maintained horizontally when said first steps are in said upper and lower horizontal portions, and said first steps moving upwardly and downwardly along said sloped portion with said treads maintained horizontally when said first steps are in said intermediate sloped portion;

a second step disposed between said first steps for circulating movement together with said first steps and having forks mounted thereon, a forward and backward moving mechanism for said forks, said forks normally being in a retracted position and capable of moving to a projecting position when said mechanism is actuated, said mechanism having an inputting means for moving said forks between the retracted and projecting positions;

a third step disposed between said first and said second steps on the lower side of said second steps for circulating together with said first and second steps and having mounted thereon a vertically movable step which normally is in a lowered position and said forks are normally in the retracted position;

a first drive mechanism disposed on said main frame at each of the lower and upper horizontal portions of said load-bearing run, said first drive mechanism being normally in a retracted position and, when actuated, engageable with said inputting means when said second step is stopped at either horizontal portion of said load-bearing run for moving said forks into or out of said projecting position;

a second drive mechanism disposed on said main frame at each of the lower and upper horizontal portions of said load-bearing run, said second drive mechanism being normally in a retracted position and being brought into engagement with said inputting means of a movement mechanism of said third step when said third step is stopped at either horizontal portion of said load-bearing run to actuate said movement mechanism to pull out or to insert an engaging rod from or into an engaging hole;

a fourth step disposed between said first and said second steps on the upper side of said second step for circulating movement together with said first and second steps and having mounted thereon and inclinable portion, a movable mechanism for said inclinable portion, said inclinable portion normally being maintained horizontally and being changeable to a sloped position when said movable mechanism is actuated;

said movable mechanism of said fourth step including an inputting member normally maintained in a retracted position and capable of moving into a forward position when actuated;

a forward drive mechanism mounted on said main frame at each of the lower and upper horizontal portions of said load-bearing run, a displacement mechanism for said forward drive mechanism, said forward drive mechanism normally being maintained in a retracted position and, when actuated, engageable with said movable mechanism of said fourth step when said fourth step is stopped at either horizontal portion of said load-bearing run for moving said inputting member of said movable mechanism of said fourth step forward; and an actuator rail mounted on said main frame along said load-bearing run, said actuator rail being engageable with said inputting member of said movable mechanism of said fourth step when said inputting member is in the forward positon for displacing said inputting member of said movable mechanism of the fourth step in said sloped portion of said load-bearing run to incline the inclinable portion of said fourth step.

2. An escalator as claimed in claim 1 wherein said movable step includes treads, further comprising:

a wheel stop means mounted on said movable step of said third step, a movement mechanism for said wheel stop means, said wheel stop means being normally maintained in a retracted position and protruding from the bottom of a groove of the tread toward the edge of said movable step on the side of said horizontal portions of said load-bearing run when actuated.

3. An escalator as claimed in claim 1 wherein said forward drive mechanism comprises:

a movable frame;

a lifting means includin a threaded cylindrical engaging member secured a the lower surface of said movable frame;

a movable frame vertical movement guide means, including a guide rod and a cylindrical member loosely fitted thereon, secured at said movable frame;

an axle disposed at the longitudinal end of said main frame with its axis extending in the widthwise direction of said main frame;

a sprocket wheel secured to an end of said axle;

a sprocket wheel secured to the opposite end of said axle;

a drive belt including endless roller chains wound around said sprocket wheels and corresponding to the inputting member of said movable mechanism; and an electric motor mounted on said movable frame for driving said sprocket wheels.

4. An escalator as claimed in claim 2 wherein said displacement mechanism comprises:

an arm member secured to said main forward drive mechanism;

a guide rod extending from said arm member; and an electric motor with a brake mechanism mounted on said arm member for vertical movement of said frame.

5. An escalator as claimed in claim 1 wherein said actuator rail is mounted on said main frame to extend along said load-bearing run for engaging a roller integrally mounted on said sloped step.

* * * * *